United States Patent
Mitchell et al.

(10) Patent No.: US 8,301,684 B2
(45) Date of Patent: Oct. 30, 2012

(54) USER CHALLENGE USING INFORMATION BASED ON GEOGRAPHY OR USER IDENTITY

(75) Inventors: Andrew Mitchell, Sunnyvale, CA (US); Justin Lawyer, Palo Alto, CA (US); Scott Barta, Milpitas, CA (US)

(73) Assignee: Google Inc., Mountain View, CA (US)

( * ) Notice: Subject to any disclaimer, the term of this patent is extended or adjusted under 35 U.S.C. 154(b) by 565 days.

(21) Appl. No.: 12/393,646

(22) Filed: Feb. 26, 2009

(65) Prior Publication Data
US 2010/0218111 A1 Aug. 26, 2010

(51) Int. Cl.
*G06F 15/16* (2006.01)

(52) U.S. Cl. ........ 709/200; 709/217; 709/218; 709/219; 709/225; 709/229; 705/44; 705/67; 705/75; 705/76

(58) Field of Classification Search .................. 709/217, 709/218, 219, 225, 229; 705/44, 67, 75, 705/76
See application file for complete search history.

(56) References Cited

U.S. PATENT DOCUMENTS

| | | | |
|---|---|---|---|
| 5,835,712 A * | 11/1998 | DuFresne ...................... 709/203 |
| 5,872,917 A | 2/1999 | Hellmann |
| 6,095,413 A * | 8/2000 | Tetro et al. .................... 235/380 |
| 6,766,454 B1 | 7/2004 | Riggins |
| 6,768,450 B1 * | 7/2004 | Walters et al. ........... 342/357.59 |
| 6,804,720 B1 * | 10/2004 | Vilander et al. .............. 709/229 |
| 7,231,657 B2 * | 6/2007 | Honarvar et al. .................. 726/2 |
| 7,360,248 B1 * | 4/2008 | Kanevsky et al. ............... 726/21 |
| 7,383,570 B2 | 6/2008 | Pinkas et al. |
| 7,389,913 B2 * | 6/2008 | Starrs ............................ 235/379 |
| 7,548,890 B2 * | 6/2009 | Shakkarwar .................... 705/75 |
| 7,941,834 B2 * | 5/2011 | Beck et al. .......................... 726/6 |
| 2001/0054012 A1 * | 12/2001 | Nayyar ............................ 705/26 |
| 2002/0052805 A1 * | 5/2002 | Seki et al. ....................... 705/27 |

(Continued)

FOREIGN PATENT DOCUMENTS

JP 2008108084 A 5/2008
(Continued)

OTHER PUBLICATIONS

International Search Report and Written Opinion for PCT Application No. PCT/US2010/025072, mailed Sep. 30, 2010, 13 pages.

*Primary Examiner* — Backhean Tiv
(74) *Attorney, Agent, or Firm* — Brake Hughes Bellermann LLP

(57) ABSTRACT

Example embodiments of methods and apparatus for challenging an online user. In an example embodiment, a method includes receiving, at an online service provider, a request from a user to access one or more features of an online service running on a host server and also receiving an indication of a geography associated with the user. The example method further includes sending, to the user, information associated with the indicated geography in combination with information not associated with the indicated geography and a request that the user select the information associated with the indicated geography from the combined information or select the information not associated with the indicated geography from the combined information. The example method still further includes receiving, at the online service provider, a selection from the user and, in the event the selection correctly corresponds with the request, allowing the user access to the one or more features.

15 Claims, 5 Drawing Sheets

U.S. PATENT DOCUMENTS

| | | | |
|---|---|---|---|
| 2004/0088587 A1* | 5/2004 | Ramaswamy et al. | 713/202 |
| 2005/0027602 A1* | 2/2005 | Haddad | 705/17 |
| 2005/0108178 A1* | 5/2005 | York | 705/75 |
| 2006/0075001 A1* | 4/2006 | Canning et al. | 707/203 |
| 2006/0106806 A1* | 5/2006 | Sperling et al. | 707/10 |
| 2006/0173792 A1* | 8/2006 | Glass | 705/75 |
| 2006/0173793 A1* | 8/2006 | Glass | 705/75 |
| 2007/0100752 A1* | 5/2007 | Wallaja et al. | 705/44 |
| 2007/0244989 A1* | 10/2007 | Ryder | 709/217 |
| 2008/0066165 A1* | 3/2008 | Rosenoer | 726/5 |
| 2008/0103972 A1* | 5/2008 | Lanc | 705/44 |
| 2008/0112551 A1* | 5/2008 | Forbes et al. | 379/142.1 |
| 2008/0181140 A1* | 7/2008 | Bangor et al. | 370/261 |
| 2008/0305860 A1* | 12/2008 | Linner | 463/25 |
| 2008/0319869 A1* | 12/2008 | Carlson et al. | 705/26 |
| 2009/0094164 A1* | 4/2009 | Fontaine et al. | 705/67 |
| 2009/0171966 A1* | 7/2009 | Heaven et al. | 707/9 |
| 2009/0187492 A1* | 7/2009 | Hammad et al. | 705/26 |
| 2009/0197617 A1* | 8/2009 | Jayanthi | 455/456.2 |
| 2009/0228370 A1* | 9/2009 | Shakkarwar | 705/26 |
| 2009/0241201 A1* | 9/2009 | Wootton et al. | 726/28 |
| 2009/0259588 A1* | 10/2009 | Lindsay | 705/40 |
| 2009/0292814 A1* | 11/2009 | Ting et al. | 709/229 |
| 2009/0319426 A1* | 12/2009 | Bain | 705/42 |
| 2010/0100949 A1* | 4/2010 | Sonwane et al. | 726/7 |
| 2010/0114776 A1* | 5/2010 | Weller et al. | 705/44 |
| 2010/0122347 A1* | 5/2010 | Nadler | 726/26 |
| 2010/0146614 A1* | 6/2010 | Savoor | 726/10 |
| 2010/0176916 A1* | 7/2010 | Baucom | 340/5.5 |
| 2010/0218111 A1* | 8/2010 | Mitchell et al. | 715/745 |
| 2010/0274732 A1* | 10/2010 | Grinchenko et al. | 705/317 |
| 2011/0016050 A1* | 1/2011 | Evans | 705/44 |
| 2011/0066702 A1* | 3/2011 | Contino et al. | 709/217 |

FOREIGN PATENT DOCUMENTS

| | | |
|---|---|---|
| KR | 20070029537 A | 3/2007 |
| KR | 20090000824 A | 1/2009 |
| WO | WO 2010/099114 A2 | 9/2010 |

* cited by examiner

USER CHALLENGE USING INFORMATION BASED ON GEOGRAPHY OR USER IDENTITY

TECHNICAL FIELD

This description relates generally to challenging an online user, such as challenging a user to determine the user's familiarity with a provided geography or information associated with a user identity, such as an online user identity.

BACKGROUND

As part of the rapid growth of Internet and World Wide Web use, there has been an ever increasing growth in the availability of online services. Such online services include, for example, online banking, online email services, online picture sharing services, online dating services and online social networks. A single online service provider may provide a number of such services to online users. These services are, however, subject to fraud and abuse. For example, some users may sign up for online services using false information with the intent to misuse or abuse such services. For instance, someone may sign up for online email accounts and then use those accounts to generate and distribute unsolicited commercial emails, known as SPAM. In other cases, someone may use false information to sign up for an online service with the intent of distributing materials for which the particular online service is not intended. For example, someone may sign up with an online social networking service with the intent to use the social networking service to distribute commercial material. In some cases, such attempts to misuse or abuse online services is automated, where a computer program is used to sign up for such online services and carry out an improper use.

In order to reduce the amount of such fraud and/or abuse, online service providers may use a number of techniques. For instance, an online service provider may require that an individual attempting to sign up for an online service, or use a feature of an online service, perform an action that provides some level of confidence that the individual's intent is not to misuse the online service or services. For instance, to prevent fraud and/or misuse in the case of automated attempts to access, or use features of an online service, many online service providers use what is know as CAPTCHA technology, where a distorted series of characters is presented on a graphical interface and access to the service (or features of such services) is allowed only if the correct sequence of characters is entered by a user and returned to the online service provider's server that is monitoring access to the online services. A number of other techniques also exist for prevention of both automated and manual abuse. However, a drawback of current approaches is that they do not provide sufficient assurance that a user seeking to access an online service is who they claim to be. Additionally, abusers of online services often develop automated ways of circumventing fraud prevention techniques, such as CAPTCHA technology.

SUMMARY

In a first general aspect, an example method includes receiving, at an online service provider, a request from a user to access one or more features of an online service running on a host server and also receiving an indication of a geography associated with the user. The example method further includes sending, to the user, information associated with the indicated geography in combination with information not associated with the indicated geography and a request that the user select the information associated with the indicated geography from the combined information or select the information not associated with the indicated geography from the combined information. The example method still further includes receiving, at the online service provider, a selection from the user and, in the event the selection correctly corresponds with the request, allowing the user access to the one or more features.

In a second general aspect, an example method includes receiving, from a user, at an online service provider a request for access to one or more features of an online service running on a host server and an indication of a person's identity. The example method further includes sending, to the user, information associated with the person in combination with information not associated with the person, wherein the information associated with the person is obtained based on an online user identity profile corresponding with the person and a request that the user select the information associated with the person from the combined information or select the information not associated with the person from the combined information. The example method still further includes receiving, at the online service provider, a selection from the user and, in the event the selection correctly corresponds with the request, allowing the user access to the one or more features.

In third general aspect, an example method includes receiving, at an online service provider, a request from a user to access one or more features of an online service running on a host server and also receiving, from the user, an indication of a geography. The example method further includes sending, to the user, a question in a language associated with the indicated geography and a request that the user respond to the question. The example method further includes receiving, at the online service provider, a response from the user and, in the event the response correctly corresponds with the question, allowing the user access to the one or more features.

In a fourth general aspect, an example method includes receiving, at an online service provider, a request from a user to access one or more features of an online service running on a host server and also receiving, from the user, an indication of a geography. The example method further includes sending, to the user, software configured to identify radio signals and a request that the user run the software. The example method further includes receiving an indication of one or more radio signals identified by the software and, in the event the radio signals identified by the software correctly correspond with radio signals associated with the indicated geography, allowing the user access to the one or more features.

BRIEF DESCRIPTION OF THE DRAWINGS

Like reference symbols in the various drawings indicate like elements.

DETAILED DESCRIPTION

Figure 1:
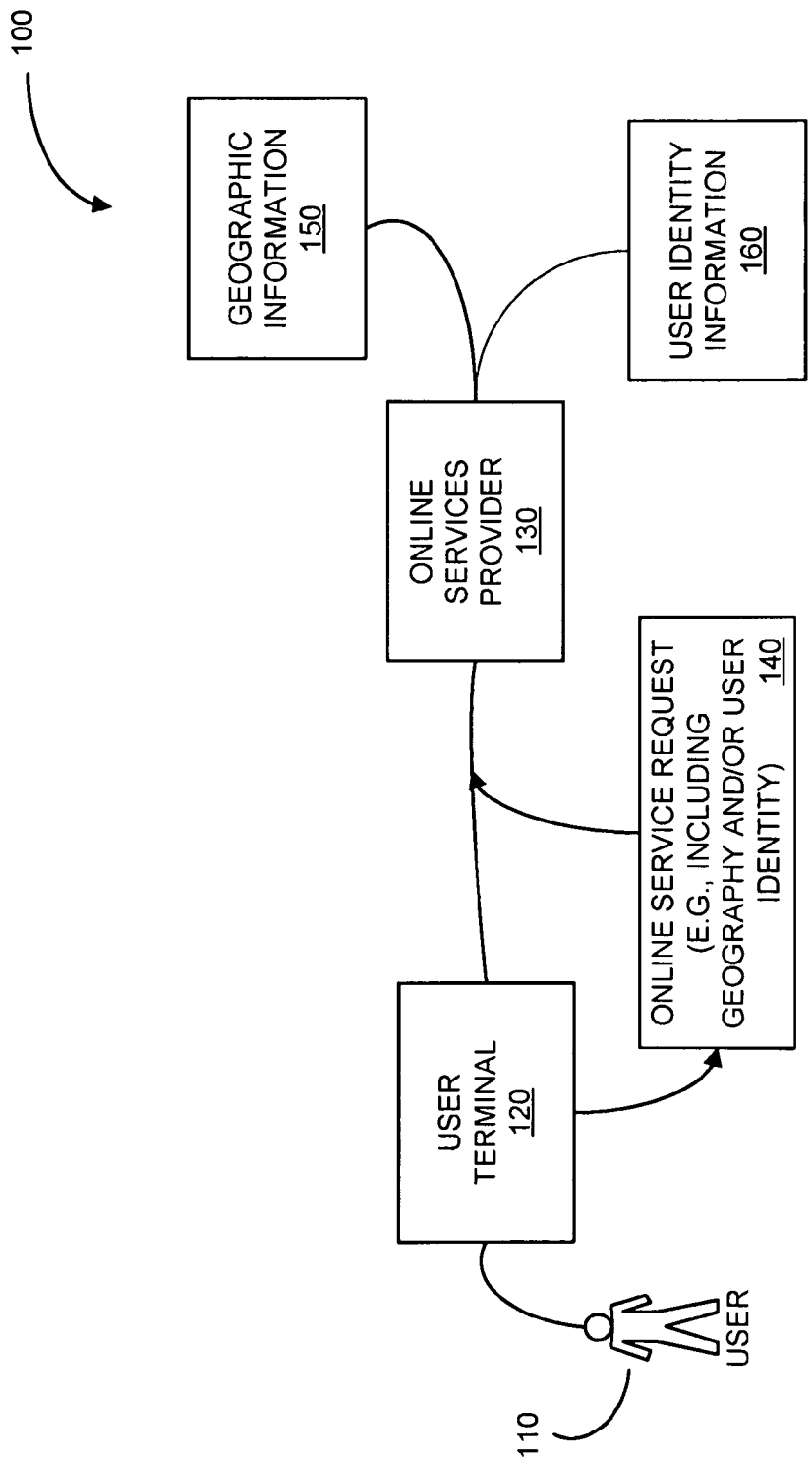
FIG. 1 is a block diagram illustrating a network in which a user challenge may be implemented in accordance with an example embodiment.

FIG. 1 is a block diagram illustrating a network 100. The network 100 may be used to implement a user challenge in accordance with example embodiments described herein. For instance, the network 100 may be used to challenge a user 110 that is seeking access (e.g., via a user terminal 120) to one or more online services (or features of those services) provided by an online service provider 130. The online service provider 130 may be implemented using a server or other computing device connected to the Internet and/or the World Wide Web. The user terminal 120 may take a number of forms. For instance, the user terminal 120 may include a desktop computer, a laptop computer, a wireless communication device, an Internet appliance, or a number of other appropriate devices.

In the network 100, the user 110 may send, using the user terminal 120, a request 140 to the online service provider 130. The request 140 may include a request to access an online service, or use one or more features of an online service provided by the online service provider 130, such as an online email service. In this example, the request 140 may include an indication of a geography where the user 110 claims to be located. The indication of geography may be explicitly provided by the user 110 in the request 140 or may be determined based on other information associated with the request. For instance, the indication of geography may be determined based on an Internet Protocol (IP) address associated with the request 140. As is known, an IP address included in data communications may be falsified or "spoofed," particularly in cases of fraud or misuse. Further, if the user 110 explicitly provides the indication of geography, the user 110 may easily provide a falsified indication of geography. In an example embodiment, the indication of geography may, alternatively, be included in a user profile that is associated with the user 110, or associated with another person in the case of fraud.

In such approaches, the online servicer provider 130 may use information that is associated with the indicated geography to conduct a user challenge, where the user challenge requests that the user 110 demonstrate familiarity with the indicated geography. If the user 110 has not provided an accurate indication of his or her geography, the user 110 will likely not be familiar with the information associated with the indicated geography and, thus, will have difficulty completing the user challenge successfully.

As an alternative, the user 110 may provide, in the request 140, an indication of an online user identity that corresponds with a user identity profile known to the online service provider 130. For instance, the user identity profile may be maintained by the online service provider 130 or by a third party provider. In such an approach, the provided user identity indication may correspond with a user identity profile that was generated at an earlier time than the request to access one or more features of an online service. Such a profile may be persistently maintained by the online service provider 130 or by the third party provider.

The user identity profile may include information about an actual person corresponding with the profile (which may or may not be the user 110), including a geography associated with the person. In certain embodiments, some or all of the information in the profile may be verified for accuracy by the online service provider 130 or by the third party provider.

In the network 100, information in the user profile may be used to conduct a user challenge. For example, the user profile may include an indication of a geographic location of the person corresponding with the profile, and information associated with that geography may be used to conduct the user challenge in similar fashion as described above.

As another example, other information corresponding with the profile may be used to conduct a user challenge. For instance, personal photos (e.g., that are stored using an online picture storage service provided by the online service provider 130) of the person corresponding with the profile may be used in combination with other photos that are not associated with the person corresponding with the profile.

As indicated above, in the network 100, the online service provider 130 may use a geography and/or a provided user identity to conduct a user challenge in response to the request 140 in order to determine whether or not to grant the user 110 access to a requested online service or to one or more features of an online service, such as to pay for a purchased item, send a message or a number of other features, depending on the particular online service. In an example embodiment, the online service provider 130 may have access to geographic information 150 associated with various geographies. For instance, the geographic information 150 may include, for various geographies, images of local landmarks, images of local celebrities, among a number of other types of geographic information, such audio and/or video files associated with various geographies.

In an example embodiment, the geographic information 150 may include questions that are in the form of text or audio files. These questions may be in languages that are respectively associated with specific geographies. These questions may be presented to the user 110 as part of a user challenge, where the user is then requested to select or provide (e.g., by typing) a response to the question, so as to demonstrate they are familiar with the language of the presented question.

The online service provider 130 may use a graphical user interface (GUI) that is displayed on the user terminal 120 to present the user 110 with information associated with an indicated geography in combination with information not associated with the indicated geography. In another embodiment, the online service provider 130 may send a question to the user 110, which may be displayed using a GUI on the user terminal 120. Alternatively, the online service provider 130 may providing an audio or video file for playback on the user terminal 120 (such as in a GUI). The GUI, audio files or video files may instruct or request that the user 110 select the information associated with the indicated geography from the combined information, or provide a response to the presented question. In other embodiments, the user 110 may be asked to select information that is not associated with the indicated geography. For instance, a single image not associated with the indicated geography may be combined with multiple images that are associated with the indicated geography, and the user 110 may be requested to select the single image that is not associated with the indicated geography.

In example embodiments, the information presented in such a user challenge may be images, audio files and/or video files, or questions in languages respectively associated with the various geographies, as previously described. Such an approach may be beneficial in reducing fraud because, if the user 110 has provided false geographic information to the online service provider 130, the user 110 will likely be unable to accurately identify the information associated with the falsely provided indication of geography in order to make an accurate selection in response to the user challenge, or to provide a correct response to a presented question.

Also, using images, audio and video information for challenging the user 110 may reduce misuse of online services because a user intending to misuse an online service cannot easily perform an online search based on such information. For instance, a user may easily locate images, audio or video files by performing an online search using a given keyword that corresponds with the content of image, audio or video files. However, it is very difficult to perform an online search starting with an image, audio or video file to locate descriptive words identifying what is contained in such media files. Because most misuse related to online services results from users that provide false information, such as false geographic locations, such an approach for conducting a user challenge (e.g., using image, audio or video associated with an indicated geography) may dramatically reduce fraud and/or misuse of online services.

As was also indicated above, in the network 100, the online service provider 130 may use a user identity profile associated with a provided online user identity to conduct a user challenge to determine whether or not to grant the user 110 access to one or more features of an online service. In an example embodiment, as previously discussed, the online service provider 130 may have access to user identity profiles that are maintained by the online service provider 130 or by a third party. The online service provider 130 may also have access to user identity information 160 that corresponds, respectively, with the user identity profiles. In one embodiment, a person may subscribe to multiple online services provided by the online service provider 130 using the same profile or online user identity.

In an example embodiment, a person may subscribe to a social networking service and a picture sharing service using a single online user identity, where both services are provided by the online service provider 130. If the user 110 sends the request 140 to access an online service (or use a feature of such a service) also provided by the online service provider 130, and the request 140 includes an online user identity corresponding with the above-discussed user identity profile, the online service provider 130 may use information from the person's social networking information or their personal pictures to conduct a user challenge. For instance, user identity information 160 associated with the person's user profile (e.g., social networking information or personal pictures) may be combined with other information. If the user 110 is not the person corresponding with the provided online user identity (i.e., is fraudulently using the online user identity), the user 110 will likely not be able to identify the user identity information 160 from the combined information and be unable to successfully complete such a user challenge, thus preventing fraudulent use of the online service provided by the online service provider 130.

Figure 2:
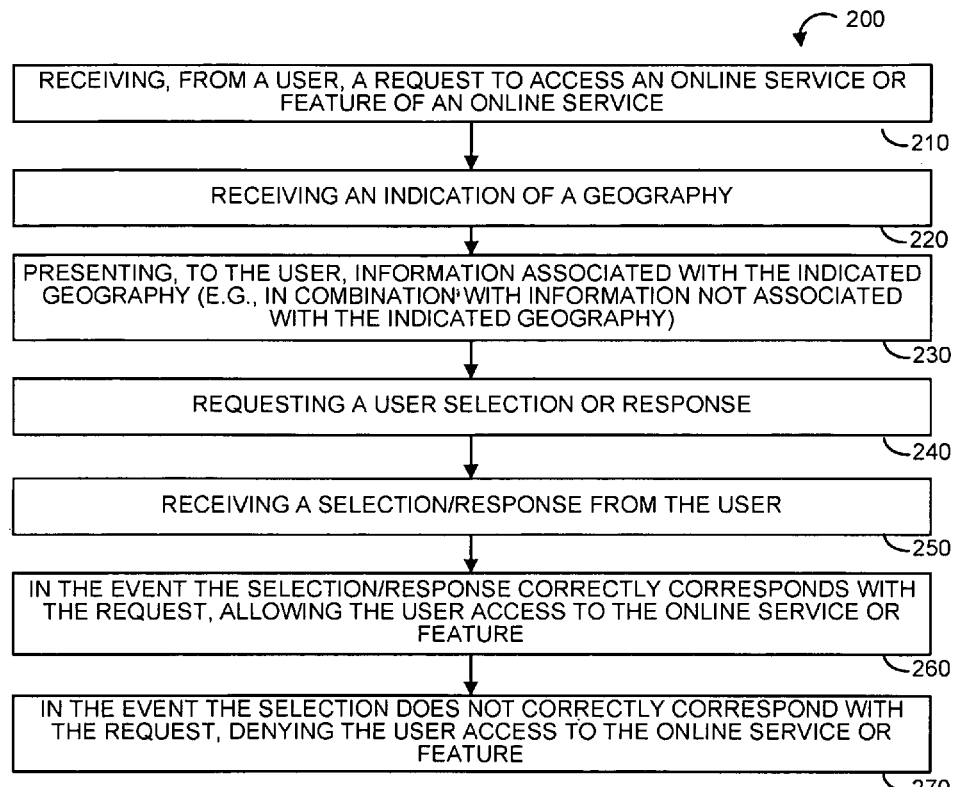
FIG. 2 is a flowchart illustrating a method for challenging a user seeking access to an online service in accordance with an example embodiment.

FIG. 2 is a flowchart illustrating a method of conducting a user challenge in accordance with an example embodiment. The method 200 may be implemented in the network 100 of FIG. 1 and will be described with further reference to FIG. 1.

The method 200 includes, at block 210, receiving, e.g., at an online service provider 130, a request 140 from a user 110 to access an online service, or a feature of an online service. At block 220, the method 200 includes receiving an indication of a geography. The indication of a geography at block 220 may indicate a geography that the user 110 claims to be located in and may be provided in the request or, as one alternative, be obtained from a user profile.

For instance, at block 220, the indication of the geography may be explicitly provided by the user. The user may indicate the geography using a street address, a postal mailing code, a city name and state, a phone number or a country, as some examples. As an alternative, the user may provide an indication of an online user identity in the request 140 that is associated with a user identity profile (profile) that is accessible to and/or maintained by the online service provider 130. The profile may include an indication of a geography of a person (not necessarily the user 110 in cases of fraud) with whom the profile corresponds. The geography indicated in the profile may be used for conducting a user challenge in the method 200.

As yet another alternative, an IP address associated with the request 140 (e.g., such as included in data headers of the request 140) may be used as the indication of the geography of the user 110. As was discussed above, it is possible for the user 110 to falsify or "spoof" an IP address associated with the user 110's data communications (e.g., the request 140). Thus, if the user 110 intends to abuse or misuse online services provided by the online service provider 130, the user 110 may spoof the IP address that is associated with the request 140 in order to provide a false indication of his or her true geographic location. By conducting a user challenge using geographic information 150 associated with the indicated geography, such as described herein, such abuse or misuse may be prevented.

At block 230, the method 200 includes presenting information associated with the indicated geography, such as in combination with information not associated with the indicated geography to the user 110, or as a question in a language associated with the indicated geography. For example, the combined information or a question in a language associated with the indicated geography may be presented to the user 110 using a GUI displayed on the user terminal 120. An example of one such GUI is described in further detail below with respect to FIG. 6. In an example embodiment, presenting the combined information may include presenting one or more images of landmarks associated with the indicated geography in combination with one or more images of landmarks not associated with the indicated geography. In such an approach, images of landmarks for the indicated geography may be selected by the online service provider 130 from the geographic information 150 and sent to the user terminal 120. The online service provider 130 may also select images not associated with the indicated geography from the geographic information 150 by selecting images of landmarks from other geographic areas.

In another example embodiment, presenting combined information at block 230 may include presenting one or more images of celebrities associated with the indicated geography in combination with one or more images of people not associated with the indicated geography. For instance, the images of celebrities for the indicated geography may include image of local celebrities, such as newscasters, or other public figures that would be generally known to people located in that geography but relatively unknown outside the indicated geography. The images of people from outside the geography may be local celebrities from other geographies or may be images of people who are not celebrities or public figures, or may be other images. Once the images are selected, the online service provider may send the selected images (as combined information) to the user terminal 120 to be displayed to the user 110 as part of a user challenge using the techniques described herein.

In still another example embodiment, presenting combined information at block 230 may include presenting one or more images of consumer products associated with the indicated geography in combination with one or more images of consumer products not associated with the indicated geography. In such an approach, the images of consumer products may be selected from the geographic information 150. Images of products sold locally in the indicated geography may be combined with images of products from sold outside the indicated geography and presented to the user 110 via a GUI displayed using the user terminal 120.

In yet another example embodiment, presenting combined information at block 230 may include presenting one or more service set identifiers (SSIDs) of wireless networks associated with the indicated geography in combination with one or more SSIDs not associated with the indicated geography. In such an approach, SSID information for wireless networks operating in various geographies may be collected by various techniques. For example, computing equipment configured to detect wireless networks and record the SSIDs of those networks may be placed in vehicles. The vehicles may then travel through the various geographies to collect the SSID information, including the geographic locations of the associated wireless networks. Once collected, the SSID information for the various geographies may be included in the geographic information 150 and used to conduct user challenges as described herein.

Information about other radio signals may also be collected and used to conduct user challenges, as is discussed further below. Briefly, however, such signals may include broadcast television signals, broadcast radio signals, cellular tower signals, and global positioning system (GPS) signals, as some examples.

In another example embodiment, presenting combined information at block 230 may include presenting one or more audio files or video files associated with the indicated geography in combination with one or more audio files not associated with the indicated geography. In such an approach, the audio or video files associated with the indicated geography may be audio video files of subject matter generally known to people located in the indicated geography, such as audio or video files of commercials for local businesses, audio or video files of local celebrities, or video files of local landmarks. The audio or video files not associated with the indicated geography may be audio or video files from other geographies and contain content not generally known to people in the indicated geography. In like fashion as previously discussed, the audio or video files used in such an approach may be obtained by the online service provider 130 from the geographic information 150 and sent to the user terminal 120 to be presented to the user 110 in a GUI displayed on the user terminal 120 and/or using audio/video devices included in the user terminal 120. In another embodiment, the user 110 may be presented with a question that is written or spoken in a language that is associated with the indicated geography. Such questions may also be presented using the user terminal 120 after being sent by the online service provider 130.

At block 240, the method 200 may include requesting that the user select the information associated with the indicated geography from the combined information, select information not associated with the indicated geography, or provide a response to a question that has been presented to the user. In an example embodiment, the request for the user selection or response may be presented to the user 110 by the online service provider 130 in a GUI along with the combined information or question. For instance, the GUI may be presented to the user 110 by communicating the GUI over the network 110 to the user terminal 120 for display to the user 110. The user 110 may then make his or her selection, or enter a response via the user terminal 120 using the GUI, such as is discussed in further detail below with respect to FIG. 6. At block 250, the method 200 may include the online service provider 130 receiving the user 110's selection or response (e.g., entered via the user terminal 120) over the network 100.

In the event the user 110's selection correctly corresponds with the information associated with the indicated geography and the request, or the user 110's response is a correct response to a presented question, the method 200, at block 260, may include the online service provider 130 allowing the user 110 access to the online service or features of the online service. However, in the event the selection does not correctly correspond with the information associated with the indicated geography and the request, or is not a correct response to a presented question, the method 110, at block 270, may include the online service provider 130 denying the user access to the online service or service features. In such a case, denying access may result in the online service provider 130 conducting additional user challenges with the user 110. If the user 110 is able to successfully complete one or more additional user challenges, the online service provider may then grant the user 110 access to the one or more features of the online service that were requested by the user 110.

Figure 3:
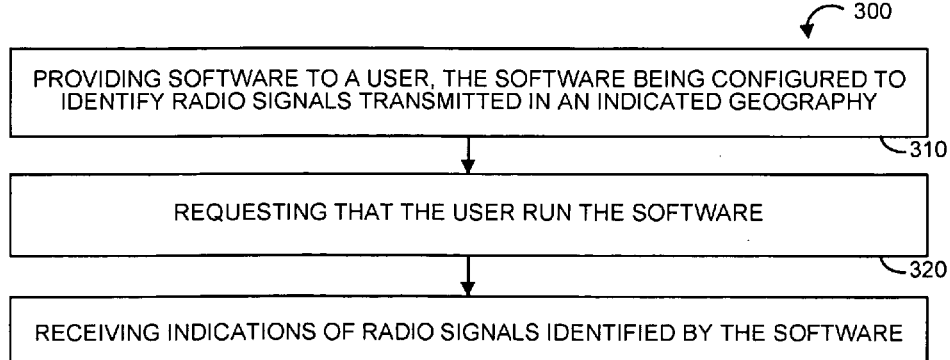
FIG. 3 is a flowchart illustrating an approach for conducting a user challenge in accordance with an example embodiment.

FIG. 3 is a flowchart illustrating a method 300 in accordance with an example embodiment that may be implemented in conjunction with the method 200 illustrated in FIG. 2 and described above. For instance, the method 300 may be implemented as blocks 230, 240 and 250 of the method 200 in an example embodiment. The method 300 may, of course, be implemented in other embodiments as well. As with the method 200, the method 300 will be described with further reference to the network 100 illustrated in FIG. 1.

Figure 7:
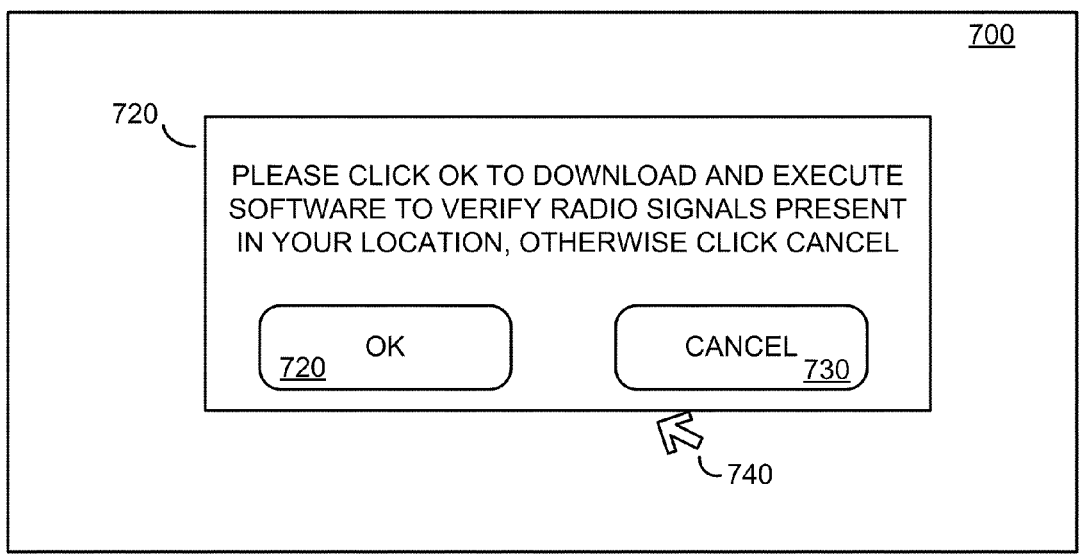
FIG. 7 is a flowchart illustrating a method for challenging a user seeking access to an online service in accordance with an example embodiment.

The method 300, at block 310, may include providing software to the user, where the provided software is configured to identify radio signals that are operating in the vicinity of the user 110. As discussed above, such signals may include wireless data network signals (e.g., SSIDs), broadcast television signals, broadcast radio signals, cellular tower signals, and global positioning system (GPS) signals, as some examples. For instance, the online service provider 130 may communicate the software over the network 100 to the user terminal 120. At block 320, the method 200 may include requesting that the user 110 run the provided software on the user terminal 120 to detect radio signals operating in his or her location. The request to run the software may be made using a GUI provided to the user terminal 120 from the online service provider 130. Such a user interface is illustrated in FIG. 7 and discussed in further detail below.

At block 330, the method 300 may include the online service provider 130 receiving, from the user terminal 120, indications of one or more radio signals identified by the software. In such an approach, the radio signals identified by the software may be compared, by the online service provider 130 (or other entity), to radio signals associated with an indicated geography, where the radio signals for the indicated geography are included in the geographic information 150. If one or more of the radio signals identified by the software match the radio signals for the indicated geography included in the geographic information 150, the online service provider 130 may grant the user 110 access to the requested online service or features of the service. However, if the radio signals identified by the software do not match the radio signals included in the geographic information 150 for the indicated geography, the online service provider 130 may deny the user 110 access to the requested online service or features, or conduct additional user challenges. Further, if the user 110 does not run the software provided by the online service provider 130, the online service provider 130 may again deny the user 110 access to the requested online service or features.

Figure 4:
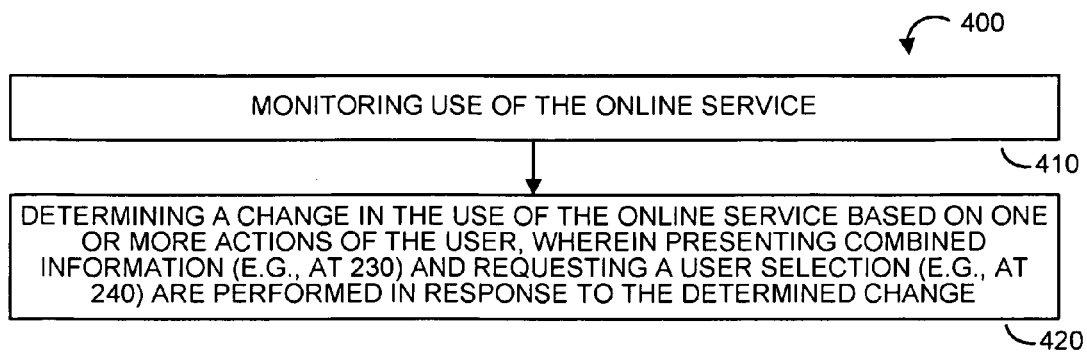
FIG. 4 is a flowchart illustrating an approach for initiating a user challenge in accordance with an example embodiment.

FIG. 4 is a flowchart illustrating a method 400 for conducting a user challenge in accordance with an example embodiment. As with the method 300, the method 400 may be implemented in conjunction with the method 200 illustrated in FIG. 2. Of course, the method 400 may be implemented in other embodiments as well. In like fashion as with FIGS. 2 and 3, the method 400 illustrated in FIG. 4 will be described with further reference to the network 100 illustrated in FIG. 1.

The method 400, at block 410, may include the online service provider 130 monitoring use of the online service, such as use after an initial request to access the service has been granted. At block 420, the online service provider 130 may determine that a change in the use of the online service has occurred. This determination may be based on one or more actions of the user 110. For instance, the online service provider 130 may determine that a dramatic increase in the number of sent emails associated with a specific email account has occurred. In the method 400, at block 420, combined challenge information, such as has been previously described, and a request for the user 110 to make a selection from the combined challenge information may be presented to the user 110 (via the user terminal 120) in response to the determined change in use of the online service.

Such an approach may be useful in situations where access to an online service is granted to one person and then another person (e.g., the user 110) gains unauthorized access to the online service by posing as the person to whom access to the service was originally granted. For instance, if the user 110 takes over (e.g., hacks into) another user's account and attempts abuse the online service, the online service provider 130 may detect a change in use of the online service and present a user challenge to the user 110. If the user 110 is unable to successfully complete the user challenge, access to the online service may be terminated (denied).

Figure 5:
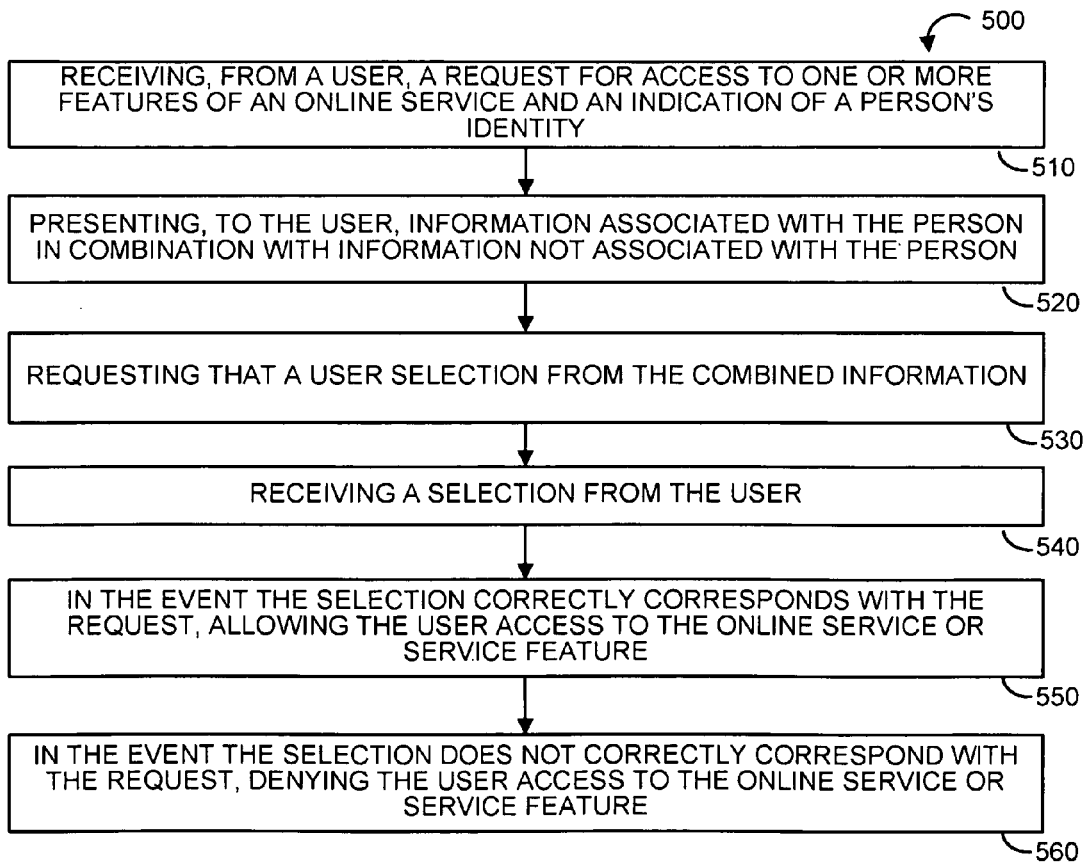
FIG. 5 is a diagram illustrating a graphical user interface for conducting a user challenge in accordance with an example embodiment.

FIG. 5 is a flowchart illustrating another method 500 for conducting a user challenge in accordance with an example embodiment. As with the methods 200, 300 and 400, the method 500 will be described with further reference to the network 100 illustrated in FIG. 1.

The method 500, at block 510, may include receiving, from the user 110 at the online service provider 130 (via the user terminal 120), a request for access to one or more features of an online service and an indication of a user identity. In the method 550, the user identity may correspond with a user identity profile (profile) for a person (which may or may not be the user 110), where the profile is maintained by, or is accessible to the online service provider 130.

At block 520, the method 500 may include the online service provider 130 sending, to the user 110 (via the user terminal 120), information associated with the person corresponding with the user identity or profile in combination with information not associated with the person. For instance, information from the profile may be used in combination with other information for conducting a user challenge. In another example embodiment, the profile may contain biographical information for the person corresponding with the profile. Such biographical information may include, a geographic location, such as a current street address, previous addresses, an indication of a current employer, indications of previous employers, a current telephone number, previous telephone numbers, a current email address, and previous email addresses, among a number of other pieces or biographical and/or historical information about the person corresponding with the user profile.

Such profile information may be presented to the user 110 in combination with other information (e.g., in a GUI) in order to conduct a user challenge in accordance with the techniques described herein. In such an approach, the user 110 may be requested to identify the information obtained from the user profile. If the user 110 successfully identifies the profile information, the online service provider 130 may grant access to the requested online service or features of the online service to the user 110. If the user 110 does not successfully identify the profile information, the online service provider 130 may deny the user 110 access to the requested online service features. As an alternative, the geography indicated in the profile may be used to conduct a user challenge in the fashions described above with respect to FIGS. 2-4. In other example embodiments, the user challenge may include requesting the user identify information that is was not obtained from the user profile. If the user 110 successfully identifies the information that was not obtained from the profile, the online service provider 130 may grant the user 110 access to the requested online service features.

As another alternative, information obtained from other online services (which may be provided by the online service provider 130) that are accessed using the same profile as indicated with the request may be used to conduct a user challenge. For instance, personal photographs from a picture sharing service may be presented to the user 110 in combination with other photos. In other embodiments, information from a social networking profile may be presented to the user 110 in combination with other information of like kind but obtained from sources not associated with the user profile. If the user 110 successfully identifies the information associated with the user profile obtained from the other online service(s), access to the requested online service (or features of the service) may be granted by the online service provider 130. If the user 110 does not successfully identify the information from the other online service(s), the online service provider 130 may deny the user 110 access to the requested online service features and/or conduct additional user challenges.

In the method 500, blocks 530, 540, 550 and 560 include similar operations as respective blocks 240, 250, 260 and 270 of the method 200 illustrated in FIG. 2. Accordingly, the operations of block 530-560 of the method 500 may be implemented in similar fashion as the blocks 240-270 of the method 200. Therefore, for purposes of brevity and clarity, the details of those operations are not described again here. Also, it is noted that the method 500, in like fashion as the method 200, may be implemented in conjunction with the methods 300 and 400 illustrated respectively in FIGS. 3 and 4.

Figure 6:
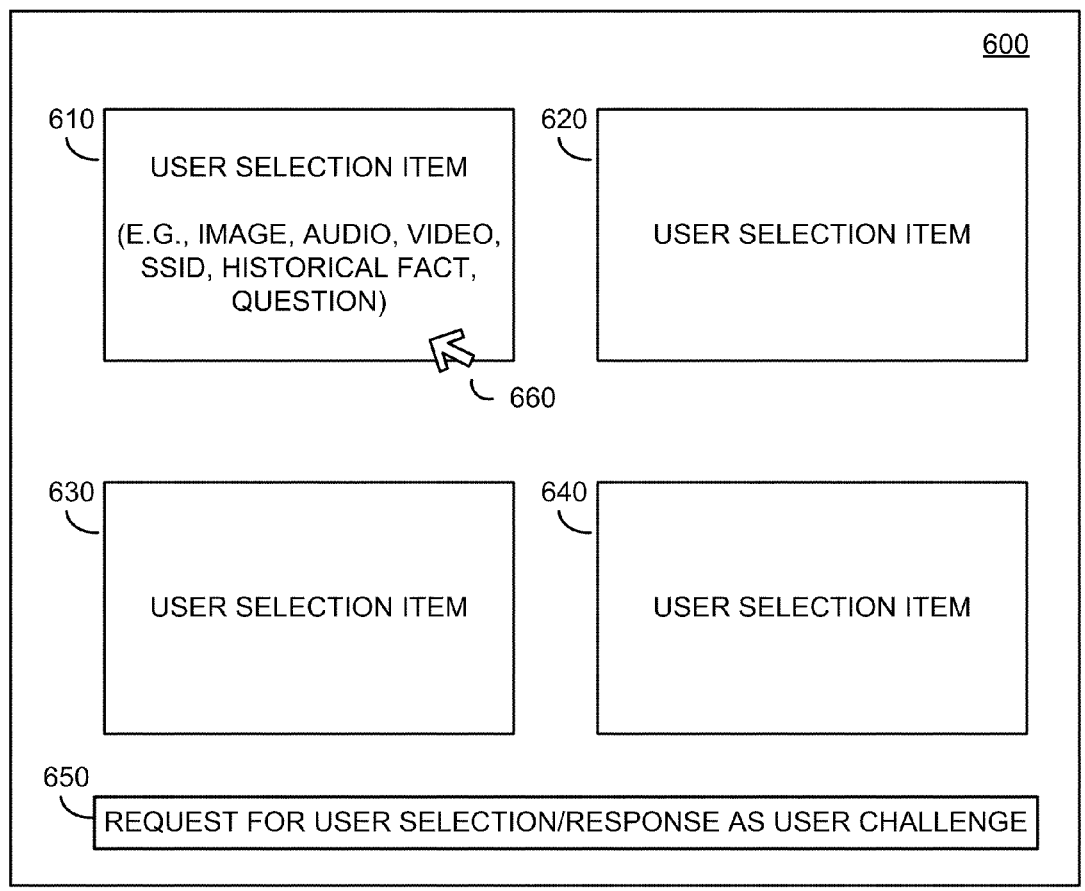
FIG. 6 is a diagram illustrating an approach for conducting a user challenge in accordance with an example embodiment.

FIG. 6 is a diagram illustrating a GUI 600 in accordance with an example embodiment. The GUI 600 may be used in connection with the methods described herein for conducting a user challenge. As with FIGS. 1-5, FIG. 6 will be described with further reference to the network 100 illustrated in FIG. 1 and discussed above.

The GUI 600 may be provided to the user terminal 120 by the online service provider 130 over the network 100. The GUI 600 may be used to present combined challenge information to the user 110 on the user terminal 120 or a question that is presented in a language associated with an indicated geography, as was previously discussed. For instance, the GUI 600 may include user selection items 610, 620, 630 and 640. For example, in the method 200 illustrated in FIG. 2, the user selection items 610-640 may represent the combined challenge information presented at block 230. Likewise, in the method 500, the selection items 610-640 may represent the combined challenge information presented at block 520.

In other embodiments, a single item of the items 610-640, i.e., a question presented in a language corresponding with an indicated geography, may be presented in the GUI 600.

In an example embodiment, the user selection items 610-640 may include images, audio files, video files, SSIDs, radio signals or historical facts about a person corresponding with a user profile for an indicated user identity, such as previously described with respect to FIGS. 2-5. In other embodiments, the user selection items 610-640 may include a number of other appropriate items for conducting a user challenge in accordance with the techniques described herein.

By way of example, if the user selection items 610-640 are images of landmarks, one or more of the user selection items 610-640 may be images of landmarks that are located in a geography that is indicated in a request to access an online service or a geography indicated in a user profile, such as was previously described. The other user selection items may be images of landmarks that are not located in the indicated geography.

In this example, the GUI 600 may also include a request 650 for the user 110 to select, from the user selection items 610-640, the image or images of the landmarks that are located in the geography indicated in the request to access the online service or the geography indicated in the user profile associated with the request. The user 110 may make his or her selection(s) from the GUI 600 using a cursor 660 on the user terminal 620. In other embodiments, the GUI 600 may be used to present a question in to the user, such as described herein, and the request 650 may be used to request the user select or enter a response to the question using the user terminal 120. In still other embodiments, the GUI 600 may include a request 650 for the user 110 to select, from the user selection items 610-640, an image or images of the landmarks that is(are) not located in the geography indicated in the request to access the online service or the geography indicated in the user profile associated with the request After the user 110 has completed his or her selection(s) or entered a response, the user terminal 120 may communicate the selection/response to the online service provider 130. Upon receiving the user 110's selection/response, the online service provider may determine whether the user 110 has successfully selected the correct item(s) or correctly answered the presented question, and grant or deny access to the online service or features of the service, such as in the fashions discussed above.

FIG. 7 is a diagram illustrating a GUI 700 that may be used in conjunction with the method 300 described above with respect to FIG. 3. As with the FIGS. 1-6, the GUI 700 of FIG. 7 will described with further reference to the network 100 illustrated in FIG. 1. As illustrated in FIG. 3, the method 300 may include, at block 310, the online service provider 130 providing software to the user terminal 120, where the software is configured to identify radio signals operating in a user 110's location. In an example embodiment, the GUI 700 may be provided to the user terminal 120 by the online service provider 130 along with the software for display to the user 110.

As shown in FIG. 7, the GUI 700 includes a dialog box 710 that request that the user 110 run the provided software to identify locally operating radio signals. The user may click an "OK" button 720 or a "CANCEL" button 730 using a cursor 740 in response to the request included in the dialog box 710. If the user 110 selects the "OK" button 720, the provided software will then run on the user terminal 120.

In this example, the provided software identifies any radio signals operating at the user 110's location and provides indications of those radio signals to the online service provider 130 over the network 100. As described above, the online service provider 130 may then grant or deny access to a requested online service, or features of a service based on a comparison of the detected radio signals to radio signals listed in the geographic information 150 for an indicated geography.

Figure 8:
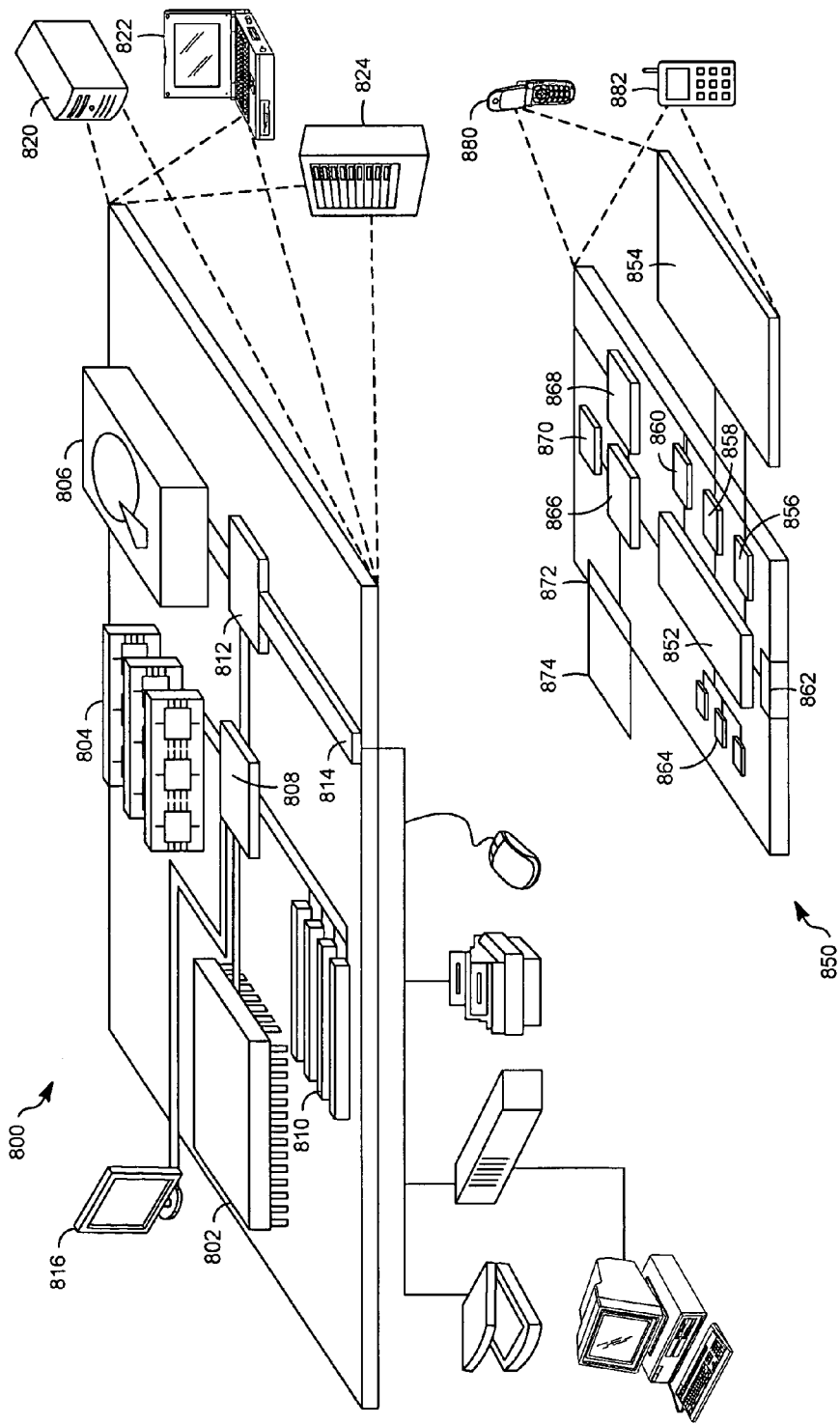
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   receiving, at an online service provider, a request from a user to access one or more features of an online service running on a host server;
   receiving an indication of a geography associated with the user;
   sending, to the user, in response to receiving the request from the user:
      one or more images associated with the indicated geography in combination with one or more images not associated with the indicated geography; and
      a request that the user select the one or more images associated with the indicated geography from the combined images or select the one or more images not associated with the indicated geography from the combined images;
   receiving, at the online service provider, a selection from the user; and
   in the event the selection correctly corresponds with the request to the user, allowing the user access to the one or more features.

2. The computer-implemented method of claim 1, wherein the indication of the geography is selected from the group consisting of: a street address provided by the user, a postal mailing code provided by the user, a city name and a state name provided by the user, a country name provided by the user, a phone number provided by the user and an Internet Protocol address associated with the request.

3. The computer-implemented method of claim 1, wherein sending the combined images comprises the online service provider providing the combined images for presentation in a graphical user interface from the user.

4. The computer-implemented method of claim 1, wherein sending the combined images comprises providing one or more images of landmarks associated with the indicated geography in combination with one or more images of landmarks not associated with the indicated geography.

5. The computer-implemented method of claim 1, wherein sending the combined images comprises providing one or more images of celebrities associated with the indicated geography in combination with one or more images of people not associated with the indicated geography.

6. The computer-implemented method of claim 1, wherein sending the combined images comprises providing one or more images of consumer products associated with the indicated geography in combination with one or more images of consumer products not associated with the indicated geography.

7. The computer-implemented method of claim 1, wherein sending the combined images comprises providing one or more video images associated with the indicated geography in combination with one or more video images not associated with the indicated geography.

8. The computer-implemented method of claim 1, further comprising:
   monitoring, at the online service provider, use of the online service; and
   determining a change in the use of the online service based on one or more actions of the user, wherein sending the combined images and the request to the user is performed in response to the determined change.

9. A computer-implemented method comprising:
   receiving, from a user, at an online service provider:
      a request for access to one or more features of an online service running on a host server; and
      an indication of a person's identity;
   sending, to the user, in response to receiving the request from the user:
      one or more images associated with the person in combination with one or more images not associated with the person, wherein the one or more images associated with the person are obtained based on an online user identity profile corresponding with the person; and
      a request that the user select the one or more images associated with the person from the combined images or select the one or more images not associated with the person from the combined images;
   receiving, at the online service provider, a selection from the user; and
   in the event the selection correctly corresponds with the request to the user, allowing the user access to the one or more features.

10. The method of claim 9, wherein:
    the person's identity corresponds with a user profile that includes an indication of a geography associated with the person; and
    sending the combined images comprises sending one or more images associated with the indicated geography in combination with one or more images not associated with the indicated geography.

11. A non-transitory computer-readable medium having recorded and stored thereon instructions that, when executed by a computing device, cause the computing device to perform the actions of:
> receiving, from a user, a request to access one or more features of an online service;
> receiving an indication of a geography associated with the user;
> sending, to the user, in response to receiving the request from the user:
>> one or more images associated with the indicated geography in combination with one or more images not associated with the indicated geography; and
>> a request that the user select the one or more images associated with the indicated geography from the combined images or select the one or more images not associated with the indicated geography from the combined images;
> receiving a selection from the user; and
> in the event the selection correctly corresponds with the request to the user, allowing the user access to the one or more features.

12. The non-transitory computer-readable medium of claim 11, wherein sending the combined images comprises providing one or more video images associated with the indicated geography in combination with one or more video images not associated with the indicated geography.

13. The non-transitory computer-readable medium of claim 11, wherein the instructions, when executed, further provide for:
> monitoring use of the online service; and
> determining a change in the use of the online service based on one or more actions of the user, wherein sending the combined images and the request are performed in response to the determined change.

14. An online service provider system comprising:
a processor; and
program storage memory operationally coupled with the processor, the program storage memory having instructions stored thereon that, when executed by the processor, provide for:
> receiving, from a user:
>> a request for access to one or more features of an online service; and
>> an indication of a person's identity;
> sending, to the user, in response to receiving the request from the user:
>> one or more images associated with the person in combination with one or more images not associated with the person, wherein the one or more images associated with the person are obtained based on an online user identity profile corresponding with the person; and
>> a request that the user select the one or more images associated with the person from the combined images or select the one or more images not associated with the person from the combined images;
> receiving a selection from the user; and
> in the event the selection correctly corresponds with the request to the user, allowing the user access to the one or more features.

15. The system of claim 14, wherein the instructions, when executed by the processor, further provide for:
> monitoring use of the online service; and
> determining a change in the use of the online service based on one or more actions of the user, wherein sending the combined images and the request to the user are performed in response to the determined change.

* * * * *